(12) United States Patent
Chakraborty et al.

(10) Patent No.: US 12,054,924 B2
(45) Date of Patent: Aug. 6, 2024

(54) SMART AND CONNECTED BACKFLOW PREVENTER ASSEMBLY

(71) Applicant: Zurn Industries, LLC, Milwaukee, WI (US)

(72) Inventors: Arindam Chakraborty, Milwaukee, WI (US); Frank Molinaro, Milwaukee, WI (US); Kevin Brockman, Milwaukee, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 0 days.

(21) Appl. No.: 16/951,664

(22) Filed: Nov. 18, 2020

(65) Prior Publication Data

US 2021/0372096 A1 Dec. 2, 2021

Related U.S. Application Data

(60) Provisional application No. 63/031,370, filed on May 28, 2020.

(51) Int. Cl.
*E03B 7/07* (2006.01)
*A62C 35/68* (2006.01)
(Continued)

(52) U.S. Cl.
CPC .............. *E03B 7/077* (2013.01); *A62C 35/68* (2013.01); *A62C 37/50* (2013.01); *B67D 1/1211* (2013.01);
(Continued)

(58) Field of Classification Search
CPC ....... A62C 35/68; A62C 37/50; F16K 37/005; F16K 37/0041; F16K 37/0091;
(Continued)

(56) References Cited

U.S. PATENT DOCUMENTS 2,893,414 A 7/1959 Snyder
3,963,043 A 6/1976 Cota et al.
(Continued)

OTHER PUBLICATIONS

Zurn Wilkins, Model 375AST w/ Wireless Monitor, 1-3, Sep. 2018, Zurn Industries, LLC, Web page <https://www.zurn.com/media-library/web_documents/pdfs/specsheets/bf-375astw1>, recorded by Internet Archive Wayback Machine on Sep. 23, 2020 at https://web.archive.org/web/20200923065358/https://www.zurn.com/media-library/web_documents/pdfs/specsheets/bf-375astw1, retrieved on Dec. 6, 2021.†
(Continued)

*Primary Examiner* — Atif H Chaudry
(74) *Attorney, Agent, or Firm* — Husch Blackwell LLP

(57) ABSTRACT

A backflow preventer assembly for a water management system includes a backflow preventer, an upstream shutoff valve, a downstream shutoff valve, a flow path, a pressure meter, and a flow meter. The upstream shutoff valve is positioned upstream from the backflow preventer. The downstream shutoff valve is positioned downstream from the backflow preventer. The flow path is defined at least partially through the backflow preventer, the upstream shutoff valve, and the downstream shutoff valve. The pressure meter includes a pressure sensor. The pressure sensor is in fluid communication with the flow path. The flow meter includes a flow sensor. The flow sensor is in fluid communication with the flow path.

8 Claims, 15 Drawing Sheets

(51) Int. Cl.
*A62C 37/50* (2006.01)
*B67D 1/12* (2006.01)
*E03C 1/10* (2006.01)
*F16K 15/03* (2006.01)
*F16K 37/00* (2006.01)
*F16L 55/07* (2006.01)
*F17D 3/01* (2006.01)
*G01L 19/00* (2006.01)

(52) U.S. Cl.
CPC .............. *E03B 7/071* (2013.01); *E03B 7/072* (2013.01); *E03C 1/106* (2013.01); *F16K 15/035* (2013.01); *F16K 37/0041* (2013.01); *F16K 37/005* (2013.01); *F16K 37/0091* (2013.01); *F16L 55/07* (2013.01); *F17D 3/01* (2013.01); *G01L 19/0084* (2013.01)

(58) Field of Classification Search
CPC ..... F16K 15/035; B67D 1/1211; E03B 7/071; E03B 7/072; E03B 7/077; E03C 1/106; F17D 3/00; F17D 3/01; F16L 55/07; G01L 19/0084
See application file for complete search history.

(56) References Cited

U.S. PATENT DOCUMENTS

| | | | |
|---|---|---|---|
| 4,437,336 A * | 3/1984 | Abe | G01F 15/0755 |
| | | | 73/40.5 R |
| 4,614,113 A * | 9/1986 | Daghe | G01F 15/185 |
| | | | 137/454.2 |
| 4,826,482 A | 5/1989 | Kamen | |
| 5,358,009 A | 10/1994 | Cambell | |
| 5,390,744 A | 2/1995 | McHugh | |
| 5,404,905 A * | 4/1995 | Lauria | E03B 7/077 |
| | | | 137/312 |
| 5,462,082 A | 10/1995 | Lauria | |
| 5,559,289 A * | 9/1996 | Brunson, IV | G01F 15/005 |
| | | | 137/512 |
| 5,568,825 A | 10/1996 | Faulk | |
| 5,713,240 A * | 2/1998 | Engelmann | F16K 15/035 |
| | | | 73/168 |
| 5,795,995 A | 8/1998 | Shimaoka et al. | |
| 5,886,267 A | 3/1999 | Ortiz | |
| 6,083,399 A | 7/2000 | Jameson et al. | |
| 6,167,965 B1 | 1/2001 | Bearden et al. | |
| 6,333,695 B2 | 12/2001 | Young | |
| 6,478,857 B2 | 11/2002 | Czabala | |
| 6,513,543 B1 | 2/2003 | Noll et al. | |
| 6,516,826 B2 | 2/2003 | Allen | |
| 6,623,630 B1 | 9/2003 | Staffler | |
| 6,792,799 B2 | 9/2004 | Ford | |
| 7,051,749 B2 | 5/2006 | Wodjenski et al. | |
| 7,056,096 B2 | 6/2006 | Takagi et al. | |
| 7,087,033 B2 | 8/2006 | Brugger et al. | |
| 7,231,937 B2 | 6/2007 | Greene et al. | |
| 7,308,824 B2 | 12/2007 | Trescott, Jr. et al. | |
| 7,525,419 B2 * | 4/2009 | Orth | G01D 18/008 |
| | | | 340/870.07 |
| 7,810,378 B2 | 10/2010 | Hunaidi et al. | |
| 7,836,950 B2 | 11/2010 | Vail, III et al. | |
| 7,880,641 B2 | 2/2011 | Parris et al. | |
| 7,987,698 B2 | 8/2011 | Nakano et al. | |
| 8,230,859 B1 | 7/2012 | Voege et al. | |
| 8,359,834 B2 | 1/2013 | Gaudin et al. | |
| 8,438,911 B2 | 5/2013 | Weissgerber | |
| 8,997,789 B2 | 4/2015 | Pozniak | |
| 9,206,676 B2 | 12/2015 | Quigley et al. | |
| 9,347,207 B2 | 5/2016 | Chen | |
| 9,347,849 B2 | 5/2016 | Mills | |
| 9,440,179 B2 | 9/2016 | Wilkinson et al. | |
| 9,476,740 B2 | 10/2016 | Zigovski et al. | |
| 9,700,663 B2 | 7/2017 | Burbank et al. | |
| 9,709,204 B2 | 7/2017 | Cheatham, III et al. | |
| 9,746,364 B2 | 8/2017 | Derschmidt | |
| 9,857,265 B2 | 1/2018 | DeVerse | |
| 9,976,378 B2 | 5/2018 | Vickers | |
| 10,087,085 B2 | 10/2018 | Baird et al. | |
| 10,125,711 B2 | 11/2018 | Willis et al. | |
| 10,173,881 B2 | 1/2019 | Beavis et al. | |
| 10,201,269 B2 | 2/2019 | Yang et al. | |
| 10,309,082 B2 | 6/2019 | Ravid et al. | |
| 10,378,940 B2 | 8/2019 | Leaders et al. | |
| 10,420,970 B2 | 9/2019 | Burkhart et al. | |
| 10,478,055 B2 | 11/2019 | Nguyen et al. | |
| 10,524,648 B2 | 1/2020 | Nguyen | |
| 10,533,307 B2 | 1/2020 | Gal et al. | |
| 10,533,915 B2 | 1/2020 | Beuk et al. | |
| 10,539,446 B2 | 1/2020 | Kitahara | |
| 10,544,810 B2 | 1/2020 | Afshari | |
| 10,561,874 B2 | 2/2020 | Williams et al. | |
| 10,590,640 B2 | 3/2020 | Pearce, III et al. | |
| 10,648,842 B2 | 5/2020 | Croteau | |
| 2003/0192377 A1 | 10/2003 | Ford | |
| 2008/0022765 A1 | 1/2008 | Witt et al. | |
| 2008/0128128 A1 | 6/2008 | Vail et al. | |
| 2008/0149180 A1 | 6/2008 | Parris et al. | |
| 2008/0150750 A1 * | 6/2008 | Parris | G07F 15/10 |
| | | | 340/870.02 |
| 2008/0184781 A1 | 8/2008 | Mulligan et al. | |
| 2009/0188211 A1 | 7/2009 | Galliher et al. | |
| 2009/0314369 A1 | 12/2009 | Pozniak | |
| 2011/0302995 A1 | 12/2011 | Lebeau | |
| 2012/0291519 A1 | 11/2012 | Kitahara | |
| 2012/0291783 A1 * | 11/2012 | Peiris | A61M 16/109 |
| | | | 128/204.21 |
| 2014/0374125 A1 * | 12/2014 | Johnson | F16K 31/54 |
| | | | 169/16 |
| 2015/0045971 A1 * | 2/2015 | Endel | F23N 1/002 |
| | | | 700/282 |
| 2015/0051743 A1 * | 2/2015 | Darnold | A01G 25/16 |
| | | | 700/284 |
| 2015/0211510 A1 | 7/2015 | Walsh et al. | |
| 2016/0298779 A1 | 10/2016 | Heiman | |
| 2017/0052088 A1 | 2/2017 | Beuk et al. | |
| 2017/0145667 A1 | 5/2017 | Gal et al. | |
| 2017/0146035 A1 | 5/2017 | Afshari | |
| 2017/0343146 A1 | 11/2017 | Jepp | |
| 2017/0350100 A1 * | 12/2017 | Atkins | G01D 9/005 |
| 2017/0370754 A1 | 12/2017 | Croteau | |
| 2018/0055349 A1 | 3/2018 | Nguyen et al. | |
| 2018/0252213 A1 | 9/2018 | Afshari | |
| 2018/0291895 A1 | 10/2018 | Afshari | |
| 2018/0328811 A1 | 11/2018 | Mielke et al. | |
| 2018/0340854 A1 | 11/2018 | Stevens | |
| 2019/0063969 A1 * | 2/2019 | Gosling | G01F 1/60 |
| 2019/0076684 A1 | 3/2019 | Williams et al. | |
| 2019/0086289 A1 * | 3/2019 | Shaw, Jr. | E03C 1/106 |
| 2019/0294183 A1 | 9/2019 | Al Khunaizi et al. | |
| 2019/0294184 A1 | 9/2019 | Al Khunaizi et al. | |
| 2019/0339155 A1 | 11/2019 | Rebich | |
| 2019/0353156 A1 | 11/2019 | Ward et al. | |
| 2020/0064794 A1 | 2/2020 | Funderburk | |
| 2020/0355576 A1 * | 11/2020 | Burke | E03C 1/106 |
| 2021/0131900 A1 * | 5/2021 | Karweck | G01L 27/002 |
| 2021/0172157 A1 * | 6/2021 | Burke | F16K 15/066 |

OTHER PUBLICATIONS

Rexnord Corp., Rexnord Corp. Investor Day 2018, 1-77, Aug. 2, 2018, https://s1.q4cdn.com/233624116/files/doc_presentations/RXN-Investor-Day-2018-Slides_FINAL.pdf.†
Zurn, Model FCIS (Connected Flood Control System), 1-2, Dec. 2019, Zurn Industries, LLC, https://www.zurn.com/media-library/web_documents/pdfs/specsheets/bf-fcis-pdf.†
Zurn, Connected Flood Control System, 1-6, May 7, 2019, Zurn Industries, LLC, Web page <https://www.zurn.com/media-library/web_documents/pdfs/brochures/480-174-connected-products-leave-behind-low>, recorded by Internet Archive Wayback Machine on Feb. 20, 2019 at <https://web.archive.org/web/20190220000300/

(56) References Cited

OTHER PUBLICATIONS https://www.zurn.com/about/press-room> and on May 11, 2020 at https://web.archive.org/web/20200511025501/https://www.zurn.com/about/press-room, retrieved on Mar. 11, 2022.†

\* cited by examiner
† cited by third party

SMART AND CONNECTED BACKFLOW PREVENTER ASSEMBLY

CROSS-REFERENCE TO RELATED APPLICATIONS

The present application claims priority to U.S. Provisional Patent Application No. 63/031,370, filed May 28, 2020, the entire contents of which is incorporated by reference herein.

FIELD

Embodiments described herein relate to a backflow preventer for use with a water management system and user interface for controlling and receiving information. The water management system and user interface may be implemented by commercial, municipal, industrial, and residential users of water management devices.

SUMMARY

Embodiments disclosed herein include a backflow preventer assembly for a water management system includes a backflow preventer, an upstream shutoff valve, a downstream shutoff valve, a flow path, a pressure meter, and a flow meter. The upstream shutoff valve is positioned upstream from the backflow preventer. The downstream shutoff valve is positioned downstream from the backflow preventer. The flow path is defined at least partially through the backflow preventer, the upstream shutoff valve, and the downstream shutoff valve. The pressure meter includes a pressure sensor. The pressure sensor is in fluid communication with the flow path. The flow meter includes a flow sensor. The flow sensor is in fluid communication with the flow path.

Embodiments disclosed herein also include a non-transitory computer readable medium. The non-transitory computer readable medium has stored thereon a program for operating a backflow preventer assembly for a water management system. The program is executable by a controller. The controller is configured to receive signals from a pressure sensor corresponding to a pressure of fluid flow passing through the backflow preventer assembly, and receive signals from a flow sensor corresponding to a flow speed of fluid flow passing through the backflow preventer assembly, and determine characteristics of fluid flow passing through the backflow preventer assembly based on the signals from the pressure sensor and the signals from the flow sensor.

Embodiments disclosed herein further include a method of monitoring flow characteristics of fluid flow passing through a backflow preventer assembly. The method includes detecting a pressure of fluid flow passing through the backflow preventer assembly, detecting a flow speed of fluid flow passing through the backflow preventer assembly, transmitting fluid pressure data and fluid flow speed data to a controller, and determining characteristics of fluid flow passing through the backflow preventer assembly with the controller. The characteristics are determined based on the fluid pressure data and the fluid flow speed data.

DETAILED DESCRIPTION

Figure 1:
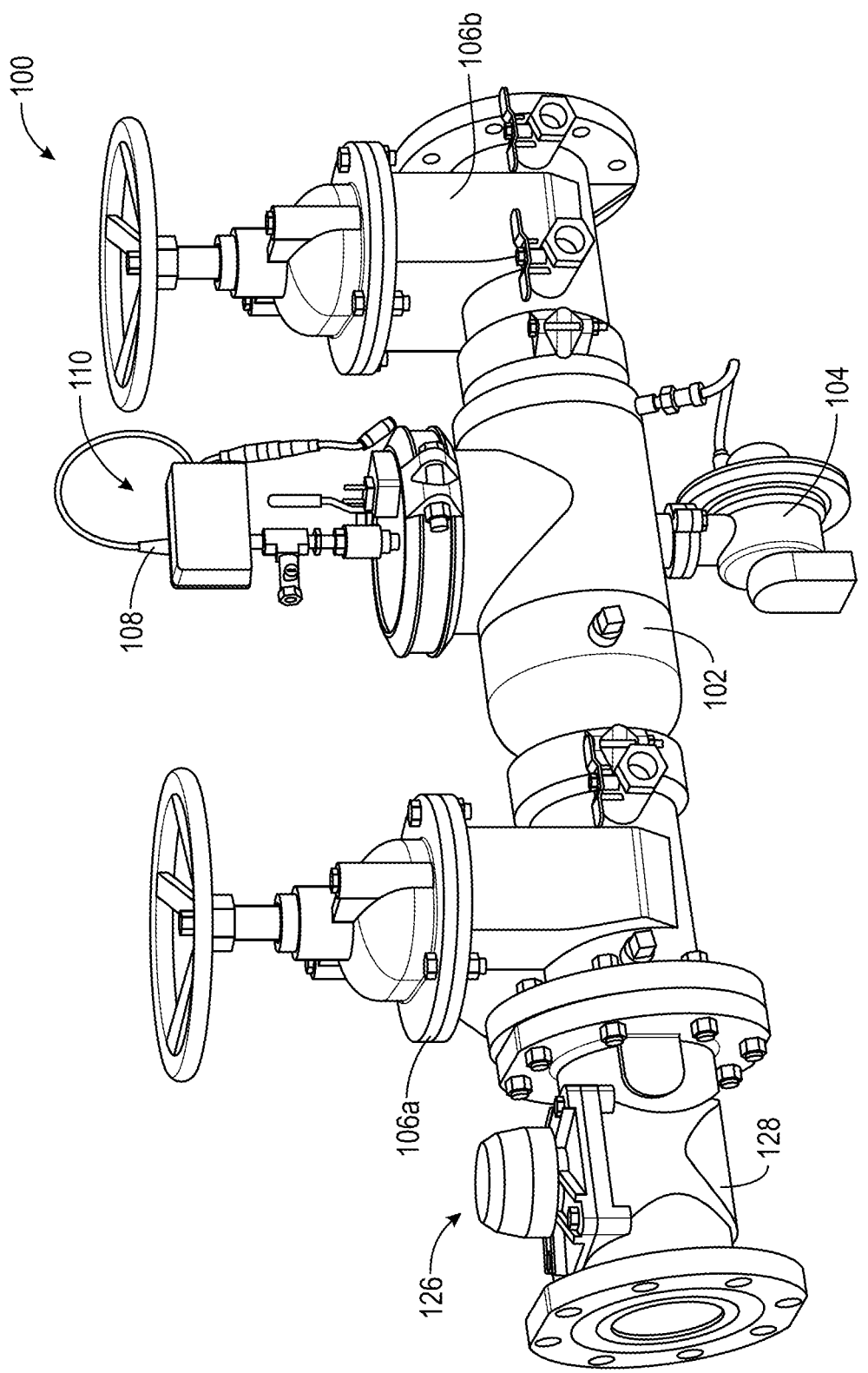
FIG. 1 is a perspective view of a backflow preventer assembly according to embodiments disclosed herein.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof. As discussed herein, a controller may include one or more of these components to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

This disclosure describes a backflow preventer including one or more sensors for use as part of an enterprise-wide water management system. A backflow preventer, along with other various optional endpoint devices, is connected to one or more networks. The sensors of the backflow preventer collect data and provide that data to the system. The data can be manipulated, analyzed, and displayed to a user of the system to provide intelligent information on usage, repair needs, preventative maintenance needs, and the like. As a result, the enterprise can develop efficiencies and receive data on how their facilities are being used to improve service and up-time for the backflow preventer.

The water management system provides an interface that the user can interact with to develop a customized dashboard with windows/widgets pertinent to the enterprise, specific building, or even a specific location within a building. The user can select from different widgets that are available. Widgets collect and display different information, which is customizable by the user. Relevant operational parameters of the backflow preventer and thresholds can be customized by the user through the interface.

Previously, testing and monitoring performance and usage of a backflow preventer assembly was carried out manually by a certified technician in person at the site of the backflow preventer assembly. These tests were performed periodically, such as annually. These prior techniques were relatively inaccurate on a moment-by-moment level and did not measure flow characteristics very often. As such, the prior techniques and devices were large, inefficient, and often required specialized technicians.

The present disclosure contemplates devices, methods, and mediums that allow for continual and/or continuous monitoring of flow characteristics, device functionality, and the like. Further, it is envisioned that at least some embodiments may not require in-person evaluation of the backflow preventer assembly at all, or at least not as often as is currently required.

With reference to FIG. 1, a backflow preventer assembly 100 is shown. The backflow preventer assembly 100 includes a main housing 102 including two check valves (not shown) disposed therein with an intermediate zone therebetween. The check valves may be of any appropriate construction. A relief valve 104 is coupled to the main housing 102 and is in fluid communication with the intermediate zone. Upstream and downstream shutoff valves 106a, 106b are disposed on opposing sides of the main housing 102.

The backflow preventer assembly 100 further includes a pressure sensor 108 in fluid communication with the flow path of the main housing 102. Particularly, the illustrated embodiment includes the pressure sensor 108 in fluid communication with the intermediate zone disposed between the two check valves.

Figures 2A, 2B, 2C:
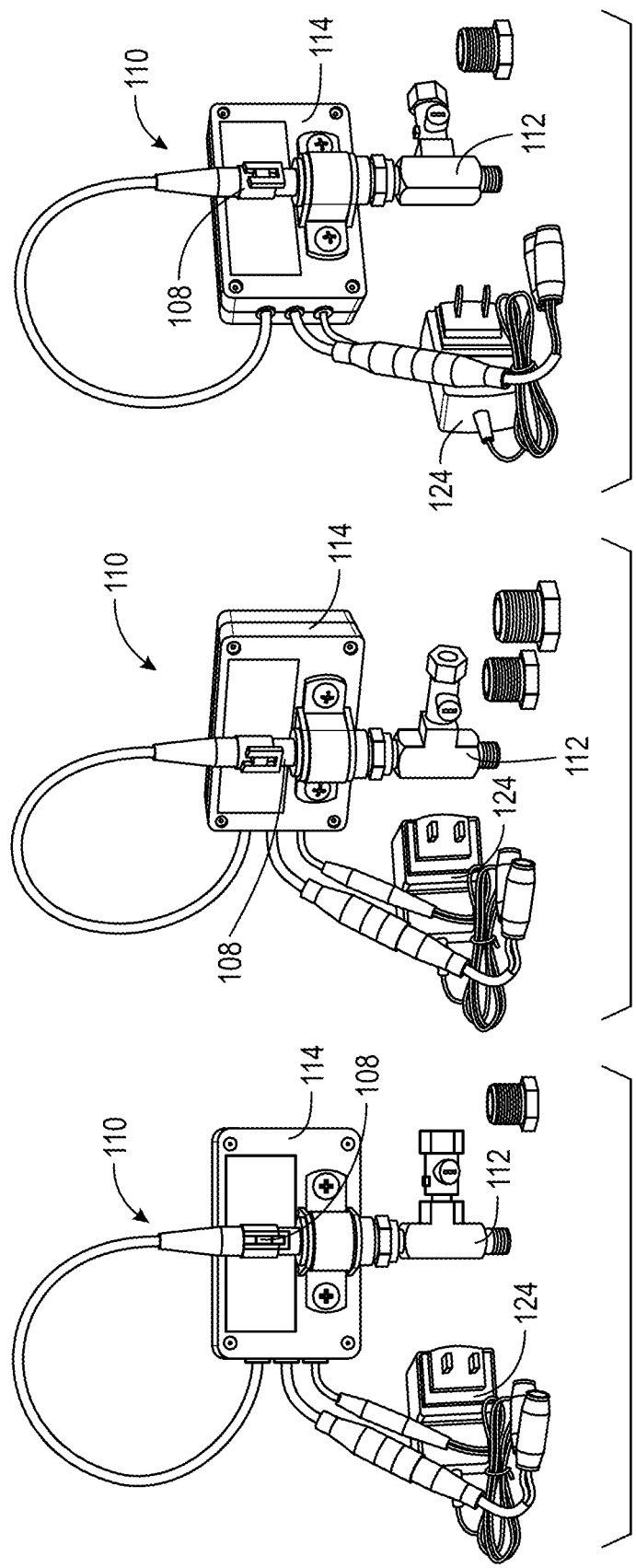
FIG. 2*a* is a front elevation view of a pressure meter of the backflow preventer assembly of FIG. 1.
FIG. 2*b* is a right perspective view of the pressure meter of FIG. 2*a*.
FIG. 2*c* is a left perspective view of the pressure meter of FIG. 2*a*.

With particular reference to FIGS. 2a, 2b, and 2c, the pressure sensor 108 is part of a pressure meter 110. The pressure meter 110 includes the pressure sensor 108, which is in fluid communication with the flow path via a connector 112. The connector 112 is threaded onto the main housing 102 at, for instance, a test port of the main housing 102. Other embodiments may include the main housing 102 including a dedicated opening for receiving the connector 112 discrete from any test ports. The pressure meter 110 may include additional sensors, such as pressure sensors, temperature sensors, or the like that may be in communication with the flow path or may be in communication with the ambient environment outside of the main housing 102.

In some embodiments, for instance, the backflow preventer assembly 100 further includes a first pressure sensor positioned upstream of both check valves, a second pressure sensor 108 positioned between the two check valves, and a third pressure sensor positioned downstream of both check valves. Other embodiments may also include sensors capable of monitoring the position of each of the two check valves.

In the illustrated embodiment, the pressure meter 110 further includes an electronics housing 114 coupled to the pressure sensor 108 and the connector 112. In other embodiments, the electronics housing 114 may instead be coupled to the main housing 102 of the backflow preventer assembly 100 or may be located remotely from the main housing 102.

Figure 3:
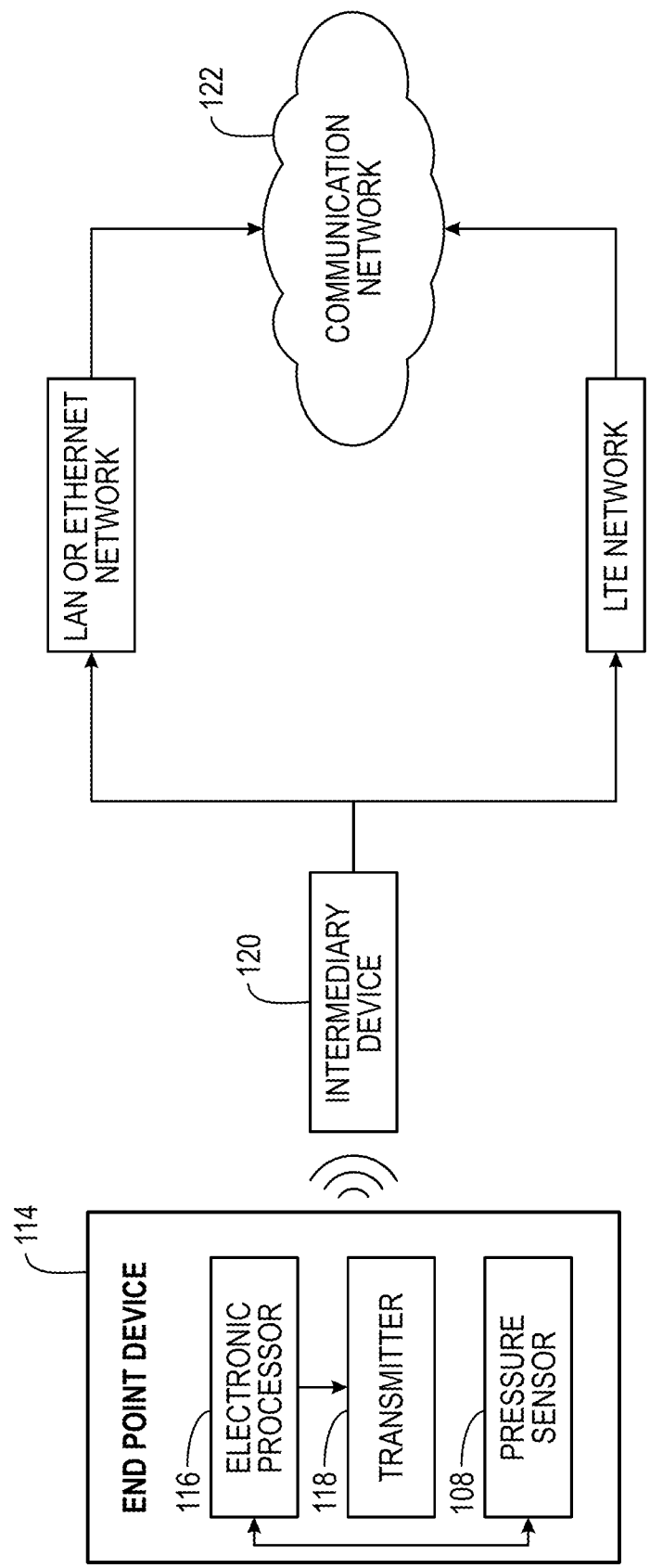
FIG. 3 is a schematic view of the pressure meter of FIG. 2*a* in wireless communication with a communication network.

As illustrated schematically in FIG. 3, the electronics housing 114 includes an electronic processor 116, a transmitter 118 (e.g., a LoRa radio system, Bluetooth, or the like), and one or more connections to the pressure sensor 108. In some embodiments, the connection to the pressure sensor 108 is in the form of one or more wires, although other embodiments may include a wireless connection. The electronic processor 116 is configured to generally manage operation of the pressure sensor 108 and monitor the flow pressure of the water passing through the backflow preventer assembly 100. The processor 116 is also configured to transmit and receive data (e.g., wirelessly) to and from the system (discussed in more detail below) via the transmitter 118 (see FIG. 7). In some embodiments, the electronic processor 116 wirelessly transmits data via the transmitter 118 to a local gateway or intermediary device 120 positioned near the backflow preventer assembly 100. The intermediary device 120 can collect data from the electronic processor 116 of the pressure meter 110. The intermediary device 120 then transmits the data on to a communication network 122 via Ethernet connection to the local area network (LAN) or via LTE cellular for storage and access by a user device (discussed in more detail below). Other embodiments may include wired communications instead of wireless transmission.

The pressure sensor 108, the electronic processor 116, the transmitter 118, and the like are powered via a power source 124. In the illustrated embodiment shown in FIGS. 2a, 2b, and 2c, the power source 124 includes a wire and plug that is connected to mains power. In other embodiments, however, the power source 124 may additionally or alternatively include one or more batteries.

As shown in FIG. 1, a flow meter 126 is coupled to an upstream side of the upstream shutoff valve 106a, although some embodiments may include the flow meter 126 positioned downstream of the downstream shutoff valve 106b. In the illustrated embodiment, the flow meter 126 is coupled to a conduit 128 that bolts onto the upstream shutoff valve 106a and forms an extended section of the flow path. In other embodiments, the flow meter 126 may be coupled to the housing of the upstream shutoff valve 106a, such that no additional conduit 128 is required.

Figure 4A:
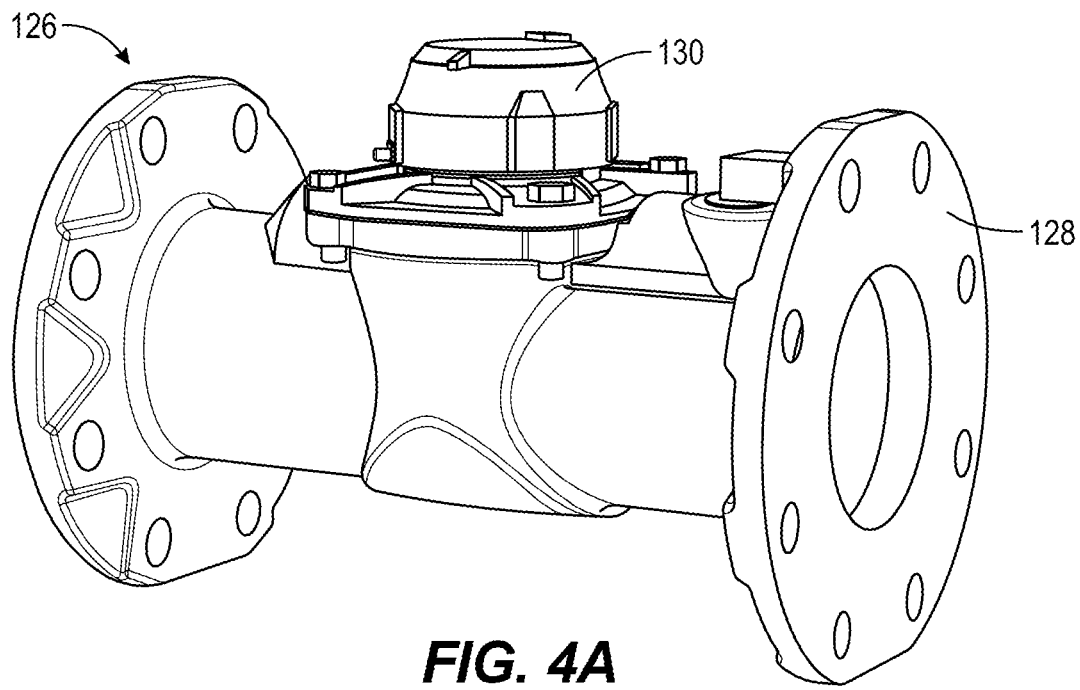
FIG. 4*a* is a right perspective view of a flow meter of the backflow preventer assembly of FIG. 1.
Figure 4B:
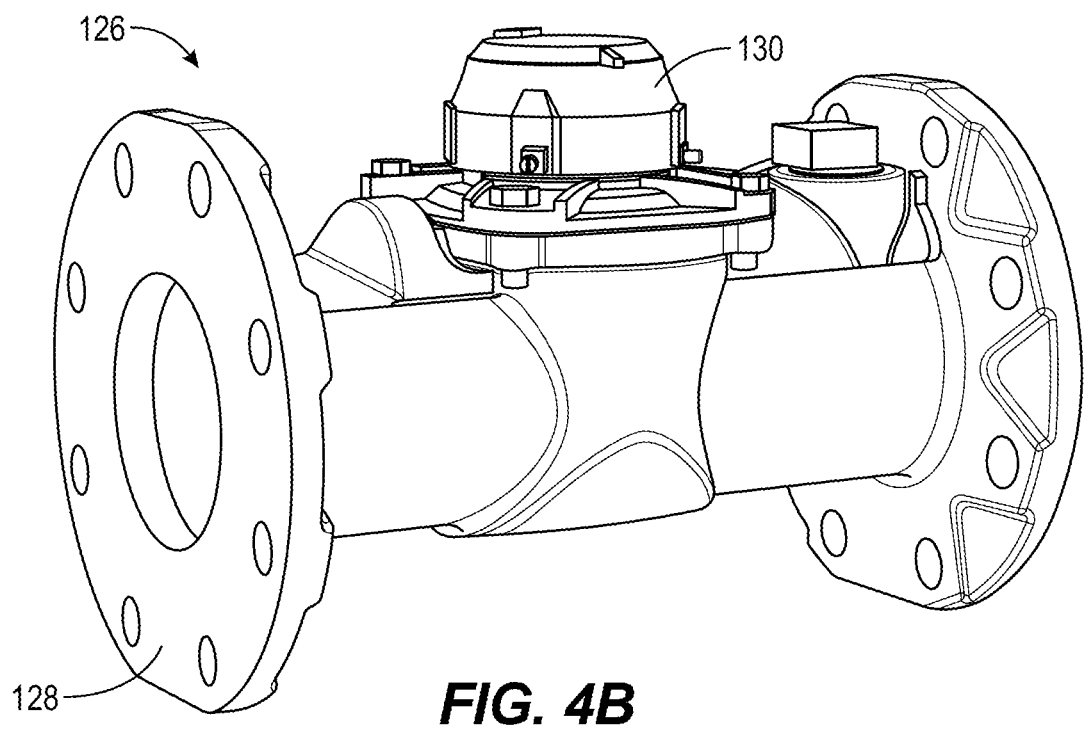
FIG. 4*b* is a left perspective view of the flow meter of FIG. 4*a*.
Figure 4C:
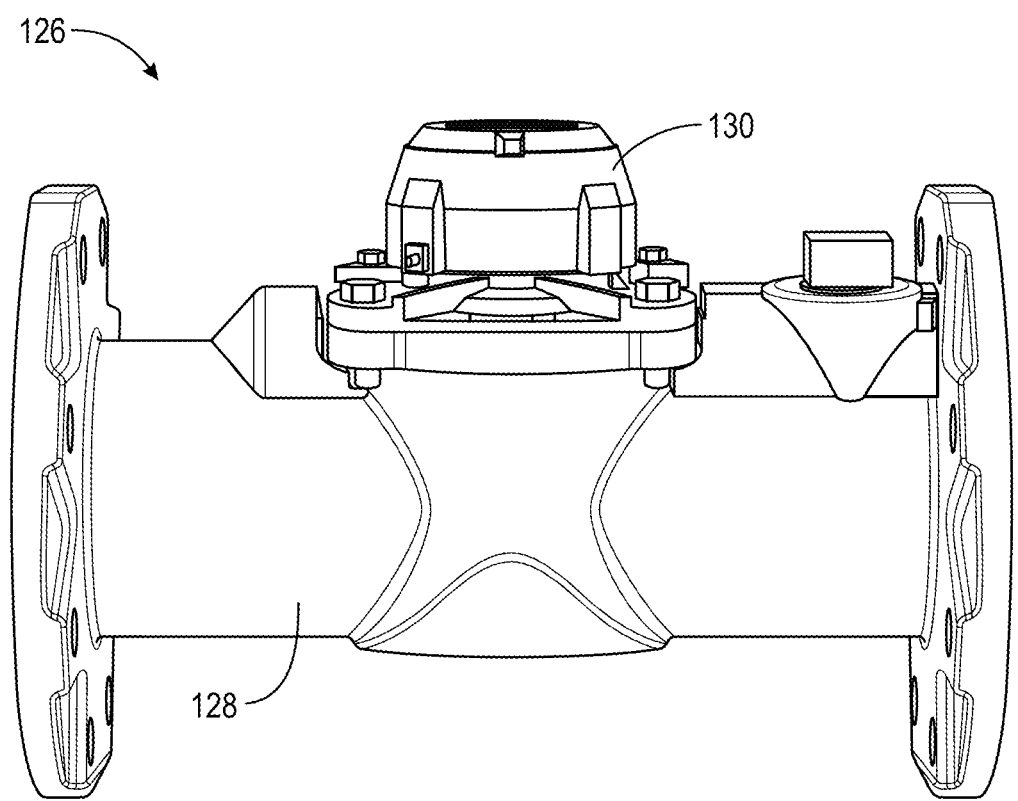
FIG. 4*c* is a front elevation view of the flow meter of FIG. 4*a*.

With reference to FIGS. 4a, 4b, and 4c, the flow meter 126 similarly includes an electronics housing 130 coupled to the conduit 128.

Figure 5:
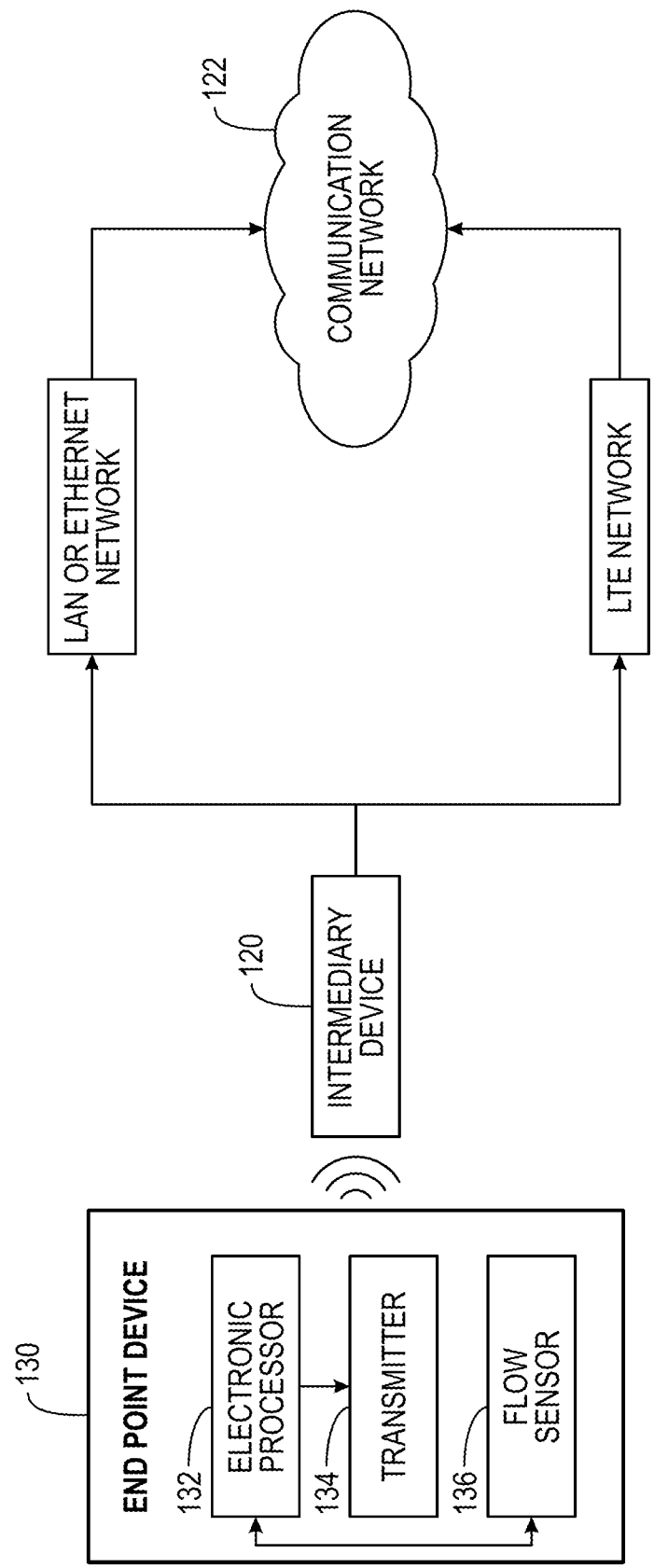
FIG. 5 is a schematic view of the flow meter of FIG. 4*a* in wireless communication with a communication network.

As illustrated schematically in FIG. 5, the electronics housing 130 contains an electronic processor 132, a transmitter 134, and one or more connections to a flow sensor 136 (e.g., a turbine positioned in the flow path). In some embodiments, the connection to the flow sensor 136 is in the form of one or more wires, although other embodiments may include a wireless connection. The electronic processor 132 is configured to generally manage operation of the flow sensor 136 and monitor the flow through the backflow preventer assembly 100. The processor 132 is also configured to transmit and receive data to and from the system via the transmitter 134 (see FIG. 7). In some embodiments, the electronic processor 132 wirelessly transmits data via the transmitter 134 to the local gateway or intermediary device 120 (discussed above) positioned near the backflow preventer assembly 100. The intermediary device 120 can collect data from the electronic processor 132 of the flow meter 126. The intermediary device 120 then transmits the data on to the communication network 122 via Ethernet connection to the local area network (LAN) or via LTE cellular for storage and access by the user device (discussed in more detail below). Other embodiments may include wired communications instead of wireless transmission.

As discussed above with regard to the pressure meter 110, the electronic components of the flow meter 126 also are powered via the power source 124. In some embodiments, the power source 124 includes a wire and plug that is connected to mains power. In other embodiments, however, the power source 124 may additionally or alternatively include one or more batteries.

Figure 6:
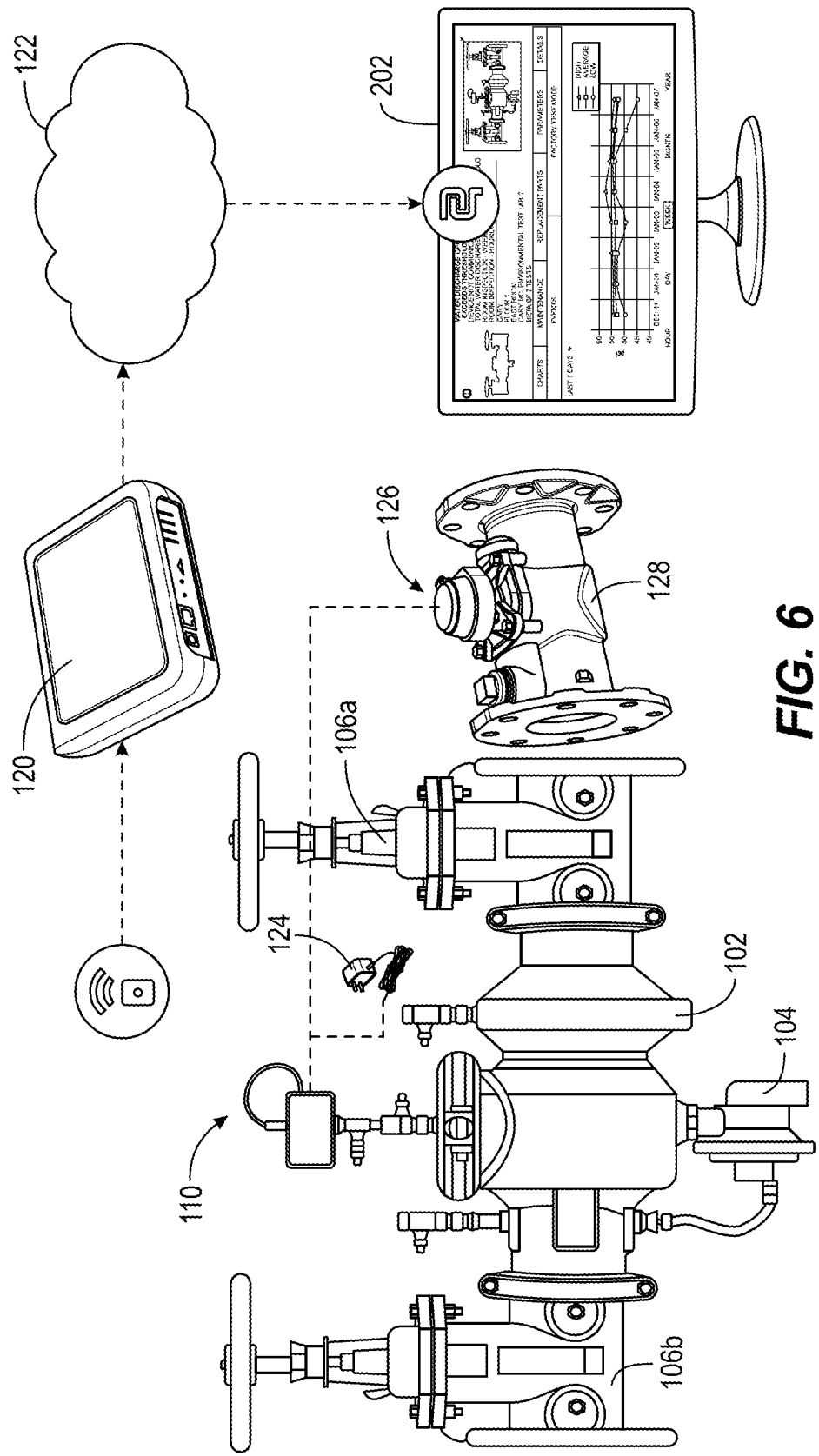
FIG. 6 is a schematic view of the backflow preventer assembly of FIG. 1 with the pressure meter and the flow meter in wireless communication with a user device via a communication network.

In the embodiment illustrated in FIG. 6, the pressure meter 110 and the flow meter 126 share a common power source 124 coupled directly to the pressure meter 110. The flow meter 126 is coupled directly to the pressure meter 110 by one or more wires. In some embodiments, however, the common power source 124 may instead be coupled directly to the flow meter 126 with the pressure meter 110 coupled directly to the flow meter 126 by wire. In still other embodiments, the common power source 124 may include multiple wires with each of the flow meter 126 and pressure meter 110 electrically coupled directly to the common power 124 source via wire.

In some embodiments, some of the electronic components of the flow meter 126 may be omitted. In such embodiments, the flow meter 126 delivers signals to the pressure meter 110 or another electronic processor for processing. Other embodiments may instead include the flow meter 126 receiving signals from the pressure meter 110 in order to process the data gathered by the pressure sensor 108 in addition to the data gathered by the flow sensor 136. Still other embodiments may include a remotely located electronic processor that receives signals from both the pressure meter 110 and the flow meter 126, such that the data gathered by each of the pressure meter 110 and the flow meter 126 is processed remotely from the pressure meter 110 and the flow meter 126.

Figure 7:
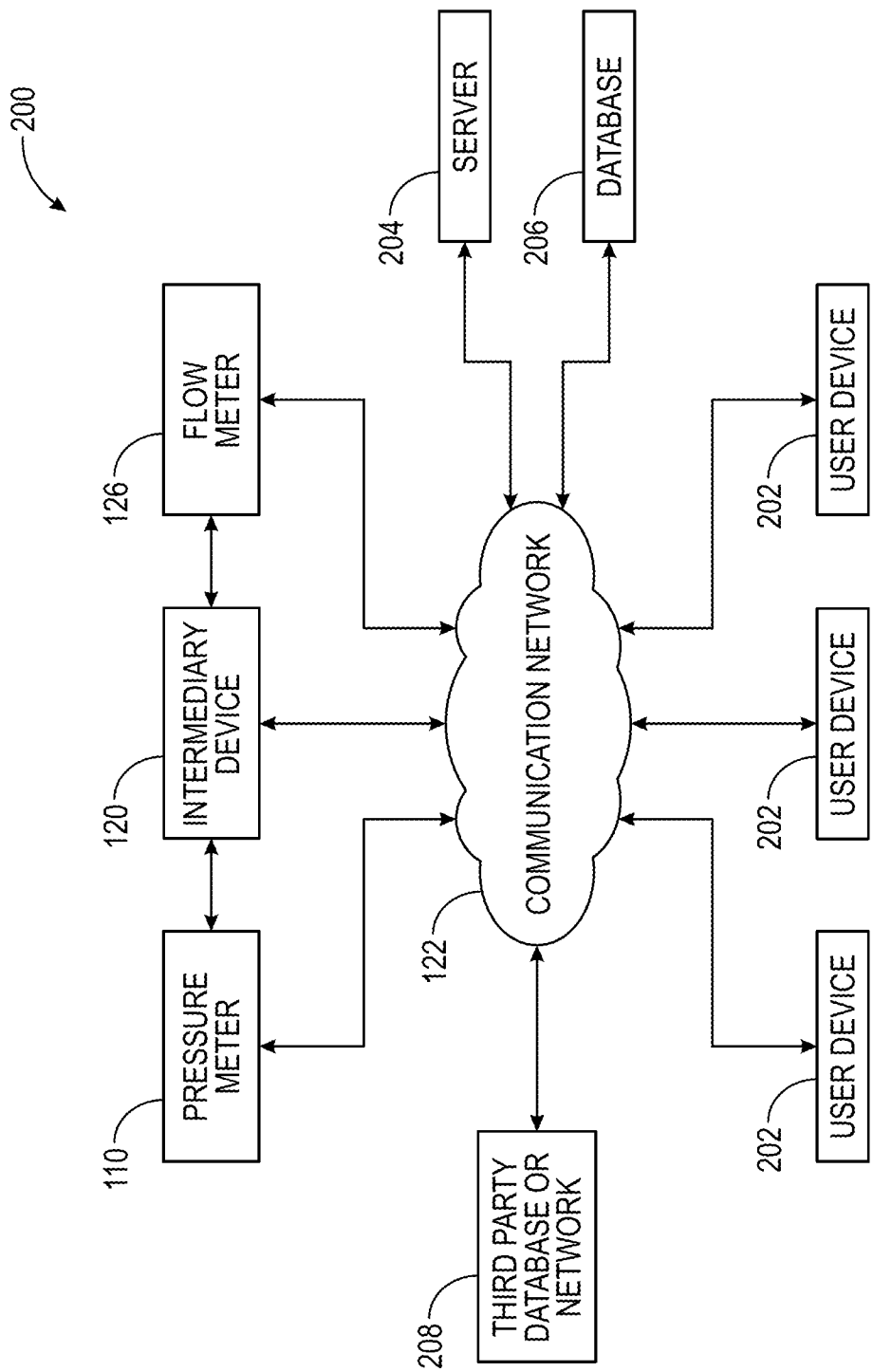
FIG. 7 is a schematic view of a water management system including the backflow preventer assembly of FIG. 1.

As shown schematically in FIG. 7, the pressure meter 110 and the flow meter 126 operate as part of a system 200 for monitoring and managing end point devices, such as, but not limited to, the pressure meter 110 and the flow meter 126 of the backflow preventer assembly 100 described above. The system 200 includes a plurality of client or user devices 202 (also referred to individually as a user device 202), a server 204, a database 206, and a communication network 122. It should be understood that the system 200 is provided as an example and, in some embodiments, the system 200 includes additional components. For example, the system 200 may include fewer or additional user devices 202, more than one communication network 122, and the like.

In still other embodiments, the system 200 may be in communication with external or third-party databases 208 to retrieve or input data such as, but not limited to, weather data, travel or navigation data, product information, water quality or other water related parameters based on locale, engineering data, and the like. Additionally, the system 200 may communicate with other programs or services to analyze data in the system 200 and apply machine learning to improve usage and data statistics for the user of the system 200. In such embodiments, the system 200 may communicate with such databases 208 to supplement calculations, readings, alerts, and the like.

The pressure meter 110, the flow meter 126, and the one or more user devices 202 communicate over the communication network 122. Portions of the communication network 122 may be implemented using a wireless network, such as a wide area network (for example, the Internet), a local area network (for example, a Bluetooth™ network, Wi-Fi, or BACNet Systems), or combinations or derivatives thereof. Alternatively or in addition, portions of the communication network 122 may be implemented using dedicated connections (such as wired or wireless connections). It should also be understood that, in some embodiments, the pressure meter 110, the flow meter 126, and the one or more user devices 202 may communicate through one or more intermediary devices 120. The user device 202 can access a secure portal, (e.g., plumb SMART™), to view the data associated with the pressure meter 110 and the flow meter 126 and view operating data.

In some embodiments, the user device 202 is a personal computing device, for example a desktop computer, a laptop computer, a terminal, a smart television, an electronic whiteboard, a tablet computer, a smart telephone, a wearable device, or the like.

Figure 8:
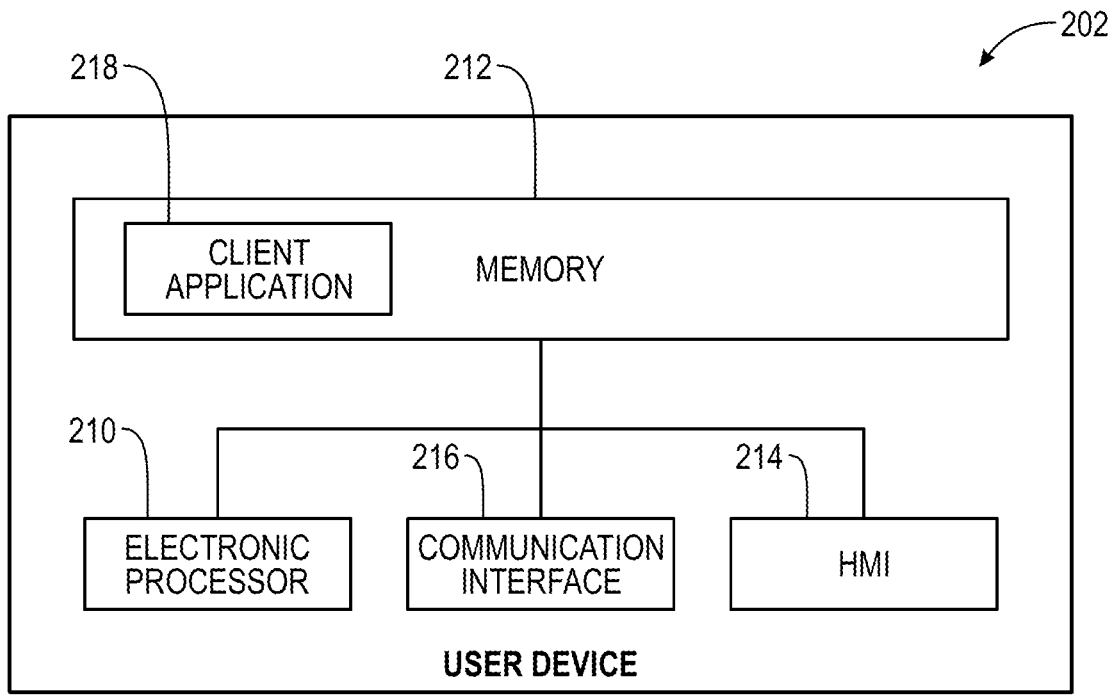
FIG. 8 is a schematic view of a user device of the water management system of FIG. 7.

As schematically illustrated in FIG. 8, the user device 202 includes an electronic processor 210, a computer-readable memory 212, and a human-machine interface (HMI) 214. The electronic processor 210, the memory 212, and the HMI 214 communicate over one or more communication lines or buses, wirelessly, or a combination thereof. In some embodiments, the user device 202 includes additional components than those illustrated in FIG. 8, and the components included in the user device 202 may be arranged in various configurations. For example, in some embodiments, the user device 202 also includes a communication interface 216, for example a transceiver, that allows the user device 202 to communicate with external devices, for example one or more servers over a communication network as noted above or directly with the pressure meter 110 and/or the flow meter 126. The user device 202 may also perform additional functionality than the functionality described in the present disclosure.

Regardless of the location of the one or more electronic processors 116, 132, 210, each electronic processor may include a microprocessor, application-specific integrated circuit (ASIC), or another suitable electronic device. Each electronic processor 116, 132, 210 is configured to retrieve data from the corresponding memory (such as memory 212) and execute, among other things, software related to the processes and methods described herein. Each memory includes a non-transitory, computer-readable storage medium. In some embodiments, the memory 212 can include a client application 218, executed by the electronic processor 210, to access various services and data provided by the server 204. The client application 218 includes a web browser (e.g., Internet Explorer®, Google Chrome®, or the like) that allows the user device 202 to access the services provided by the server 204.

The HMI 214 includes an input device, an output device, or a combination thereof. For example, the HMI 214 may include a display device, a touchscreen, a keyboard, a keypad, a button, a cursor-control device, a printer, a speaker, a virtual reality headset, a microphone, and the like. In some embodiments, the user device 202 includes multiple HMIs. For example, the user device 202 may include a touchscreen and a keypad. In some embodiments, an HMI 214 is included in the same housing as the user device 202. However, in other embodiments, an HMI 214 may be external to the user device 202 but may communicate with the user device 202 over a wired or wireless connection. For example, in some embodiments, the user device 202 includes a display device connected to the user device 202 via a cable. One or more HMIs 214 included in the user device 202 receive input (selections) from a user, to manipulate a program to obtain data related to the pressure meter 110 and/or the flow meter 126.

Figure 9:
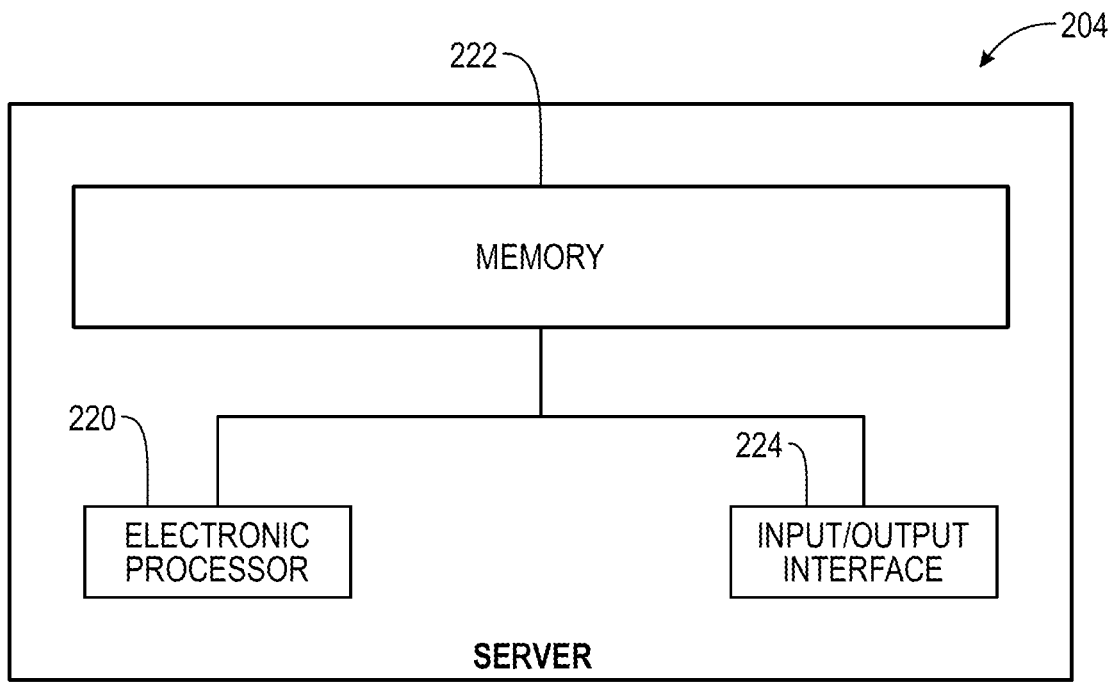
FIG. 9 is a schematic view of a server of the water management system of FIG. 7.

With reference to FIG. 9, the server 204 may be a web server where web pages can be accessed over the communication network 122 through a client, like a web browser on a user device 202. The server 204 includes a server electronic processor 220 and a server memory 222. The server 204 also includes an input/output interface 224 that allows the server 204 to communicate with external devices, for example the user device 202. It is to be understood that the server 204 may include more than one processor 220 or may be implemented as one of multiple servers configured to perform the methods described herein in a cloud computing environment, a data center, or the like.

Regardless of which processor 116, 132, 210, 220 in the system 200 collects and outputs the data (e.g., the processor 116 of the pressure meter 110, the processor 132 of the flow meter 126, the processor 210 of the user device 202, the processor 220 of the server 204, another processor, or some combination thereof), the system 200 may be configured to collect the data output by each of the above-described sensors 108, 136 and output the data to other components of the system 200 for additional analysis and interpretation.

The pressure meter 110 senses the pressure in, for instance, the intermediate zone of the backflow preventer assembly 100 and transmits corresponding signals via, for instance, the transmitter 118 to allow the system 200 to monitor the pressure in the backflow preventer assembly 100. Likewise, the flow meter 126 senses the flow through the backflow preventer assembly 100 and transmits corresponding signals via, for instance, the transmitter 134 to allow the system 200 to monitor the flow speed and flow duration through the backflow preventer assembly 100. This data can be used to calculate water usage for a building, for instance. This data can also be used to detect a backflow condition or other fault in the backflow preventer assembly 100, for instance. The calculated data can be displayed for user analysis on, for instance, the user device 202.

Figure 10:
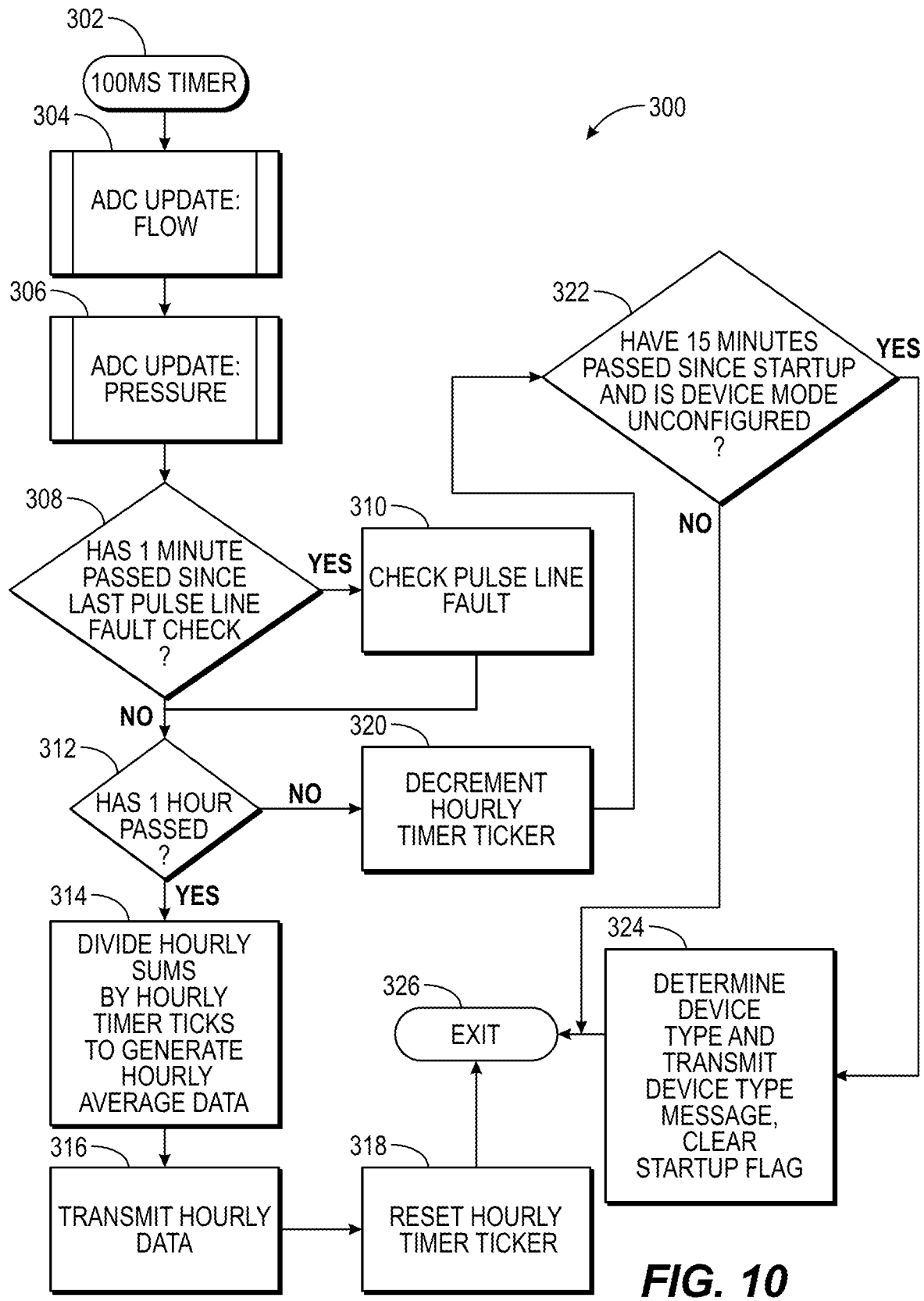
FIG. 10 is a flowchart illustrating a process of data analysis performed by the water management system of FIG. 7.

With reference to FIG. 10, in addition to the system 200 monitoring via the sensors 108, 136, one or more processors 116, 132, 210, 220 of the system 200 is capable of processing the data gathered by the sensors 108, 136 further in order to provide pertinent calculated information to the user. As shown in FIG. 10, the system 200 includes a process 300 of data analysis. The process 300 includes, in the illustrated embodiment, a first step of counting to, for instance, 100 milliseconds with a timer (step 302). After the timer has completed, the process 300 proceeds with a flow analog-digital conversion operation 304 of the signals received from the flow meter 126 (described in more detail below).

Figure 11:
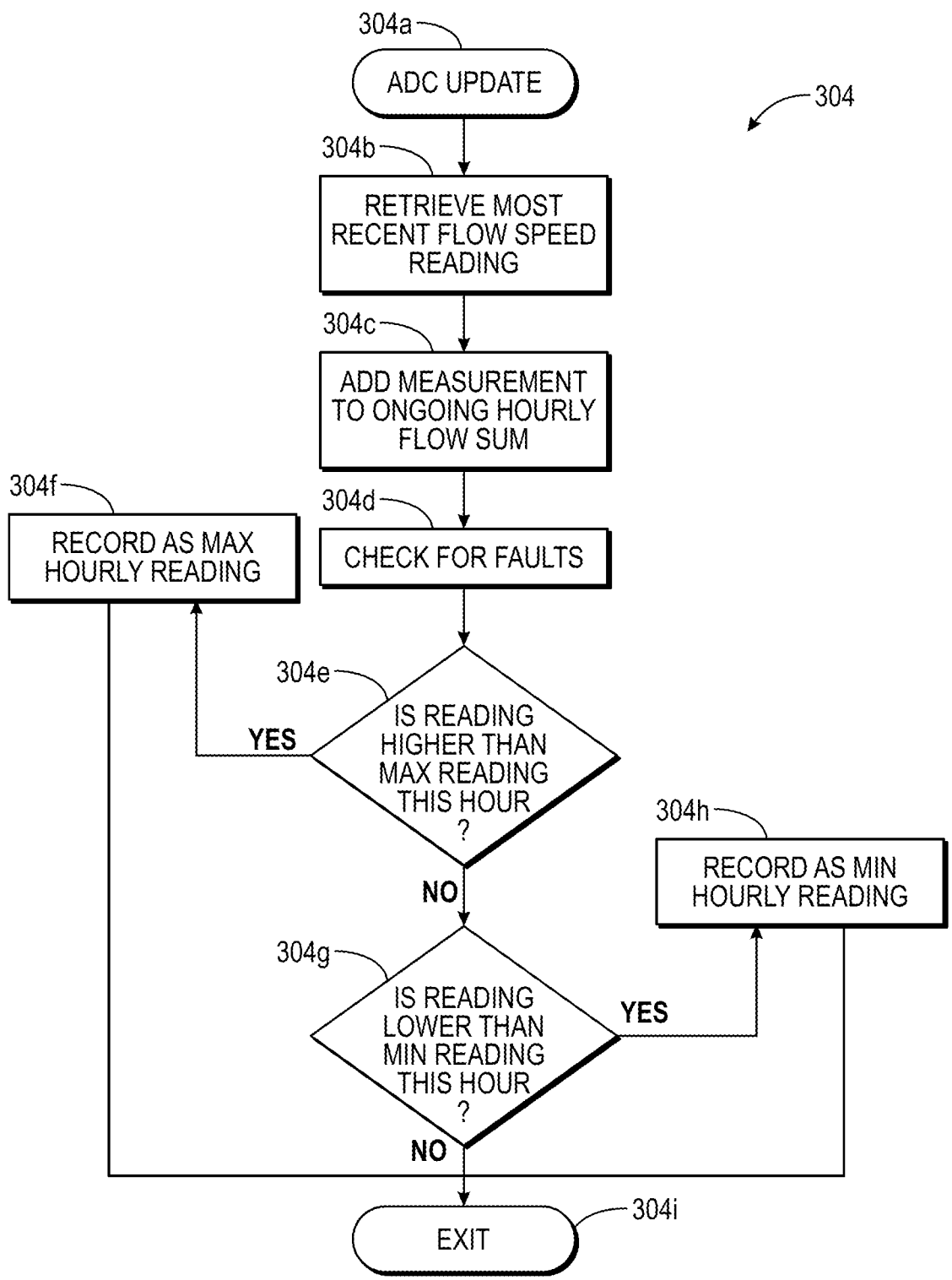
FIG. 11 is a flowchart illustrating a flow analog-digital conversion operation of the process of FIG. 10.

As shown in FIG. 11, the flow analog-digital conversion operation 304 begins with the command to update the flow analog-digital conversion values (step 304a). Once the command (step 304a) has been received from the process 300 as a whole, the operation 304 proceeds with retrieving the most recent flow reading from the flow sensor 136 (step 304b). After the most recent flow reading has been retrieved (step 304b), the operation 304 then adds the most recent flow reading to the background ongoing hourly flow sum calculation for the current hour (step 304c). It should be noted, however, that the flow sum could be calculated at different time intervals including, for instance, half an hour, two hours, three hours, or the like. After the flow sum calculation has been updated (step 304c), the operation 304 then checks for a fault condition (step 304d).

In the flow meter 126, the flow sensor 136 senses flow speed, which is converted to pulses. These pulses are digital pulses that occur with a frequency that is related to the amount of fluid that has passed the flow meter 126. Each pulse may occur for every one-hundredth of a gallon, for instance. If these pulses occur with a frequency that is determined to be outside the bounds of physical possibility, for instance, the system 200 is capable of identifying a fault. In some instances, the fault may be indicated to the user via, for instance, the user device 202. The fault may be required to be present for a predetermined amount of time such as, for instance, 10 minutes before the fault condition is indicated to the user.

Once the fault condition check (step 304d) has been completed, the operation 304 then inquires as to whether the most recent flow speed reading exceeds the maximum recorded flow speed reading for the last hour (step 304e). If the answer to the inquiry is "yes", the operation 304 then records the most recent flow speed reading retrieved at step 304b as the new maximum flow speed reading for the past hour (step 304f). If the answer to the inquiry at step 304e is instead "no" (i.e., the flow speed reading retrieved at step 304b is not the highest flow speed reading in the last hour), the operation 304 then inquires as to whether the most recent flow speed reading is lower than the minimum recorded flow speed reading for the last hour (step 304g). If the answer to the inquiry is "yes", the operation 304 then records the most recent flow speed reading retrieved at step 304b as the new minimum flow speed reading for the past hour (step 304h). Once the most recent flow speed reading has been recorded as the new maximum reading, the new minimum reading, or the inquiry at step 304g has determined the most recent flow speed reading is not the new minimum reading (i.e., the most recent flow speed reading is neither a new max or a new min reading), the operation 304 then ends at step 304i. Once the operation 304 has ended at step 304i, the process 300 then continues on to step 306.

Returning to FIG. 10, once the flow analog-digital conversion operation 304 has completed, the process 300 proceeds with a pressure analog-digital conversion operation 306 of the signals received from the pressure meter 110 (described in more detail below).

Figure 12:
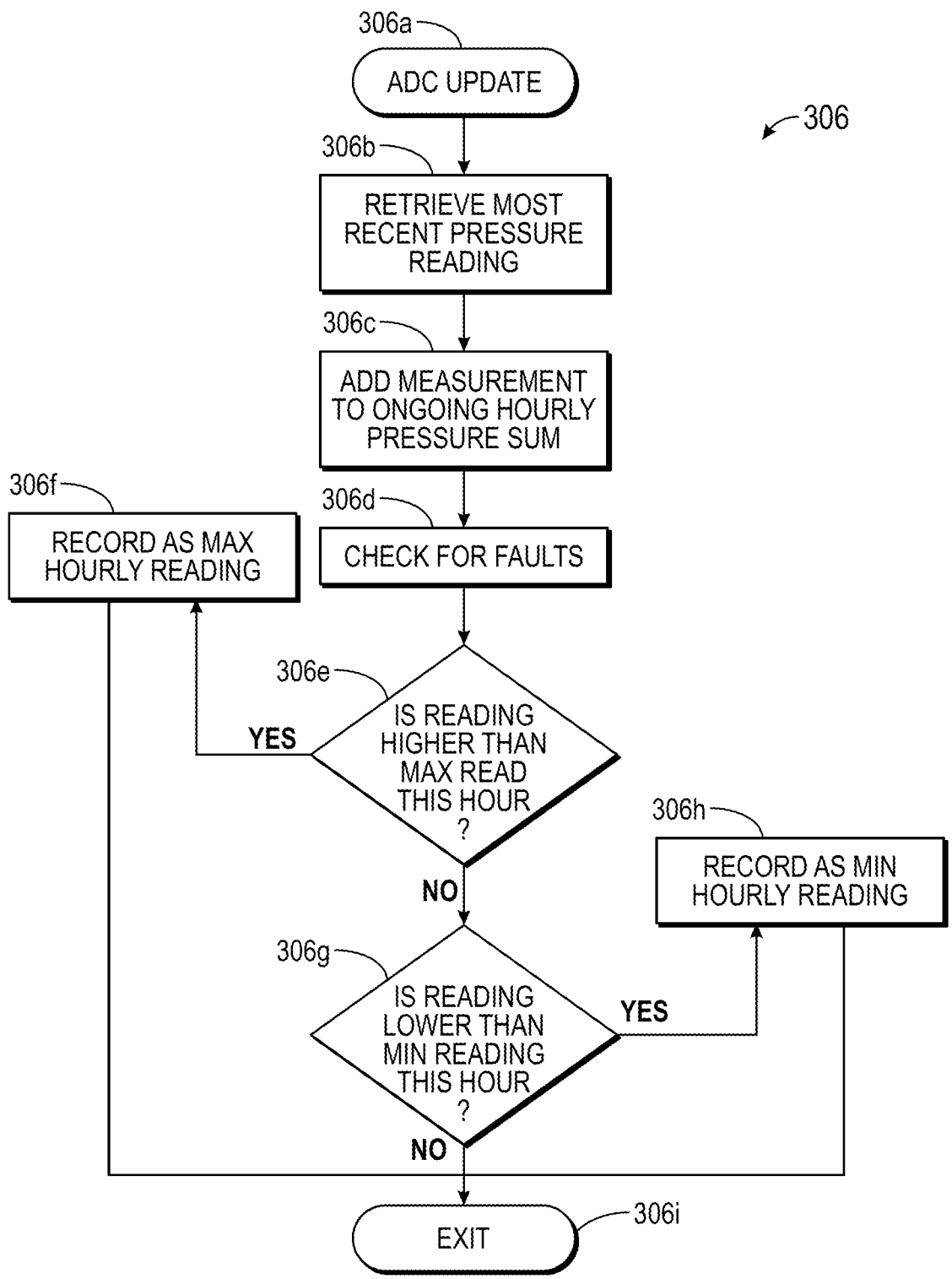
FIG. 12 is a flowchart illustrating a pressure analog-digital conversion operation of the process of FIG. 10.

As shown in FIG. 12, the pressure analog-digital conversion operation 306 operates in much the same manner as the flow analog-digital conversion operation 304 described below. The pressure analog-digital conversion operation 306 begins with the command to update the pressure analog-digital conversion values (step 306a). Once the command (step 306a) has been received from the process 300 as a whole, the operation 306 proceeds with retrieving the most recent pressure reading from the pressure sensor 108 (step 306b). After the most recent pressure reading has been retrieved (step 306b), the operation 306 then adds the most recent pressure reading to the background ongoing hourly pressure sum calculation for the current hour (step 306c). It should be noted, however, that the pressure sum could be calculated at different time intervals including, for instance, half an hour, two hours, three hours, or the like. After the pressure sum calculation has been updated (step 306c), the operation 306 then checks for a fault condition (step 306d).

In the pressure meter 110, the pressure sensor 108 senses the fluid flow pressure in the intermediate zone of the backflow preventer assembly 100, which is converted to pulses. These pulses are digital pulses that occur with a frequency that may be related to the amount of fluid that has passed the pressure meter 100, related to the amount of fluid that has passed the flow meter 126, or simply related to the timer (at step 302 described above). Each pulse may occur for every one-hundredth of a gallon that has passed through the backflow preventer assembly 100, for instance. If these pulses occur with a frequency that is determined to be outside the bounds of physical possibility, for instance, the system 200 is capable of identifying a fault. In some instances, the fault may be indicated to the user via, for instance, the user device 202. The fault may be required to be present for a predetermined amount of time such as, for instance, 10 minutes before the fault condition is indicated to the user.

Once the fault condition check (step 306d) has been completed, the operation 306 then inquires as to whether the most recent pressure reading exceeds the maximum recorded pressure reading for the last hour (step 306e). If the answer to the inquiry is "yes", the operation 306 then records the most recent pressure reading retrieved at step 306b as the new maximum pressure reading for the past hour (step 306f). If the answer to the inquiry at step 306e is instead "no" (i.e., the pressure reading retrieved at step 306b is not the highest pressure reading in the last hour), the operation 306 then inquires as to whether the most recent pressure reading is lower than the minimum recorded pressure reading for the last hour (step 306g). If the answer to the inquiry is "yes", the operation 306 then records the most recent pressure reading retrieved at step 306b as the new minimum pressure reading for the past hour (step 306h). Once the most recent pressure reading has been recorded as the new maximum reading, the new minimum reading, or the inquiry at step 306g has determined the most recent pressure reading is not the new minimum reading (i.e., the most recent pressure reading is neither a new max or a new min reading), the operation 306 then ends at step 306i. Once the operation 306 has ended at step 306i, the process 300 then continues on to step 308.

Returning to FIG. 10, after the pressure analog-digital conversion operation 306 has completed, the process 300 then inquires as to whether a threshold amount of time (e.g., one minute) has passed since the last pulse line fault check (step 308). If the answer to this inquiry is "yes", the system 200 checks the pulse line to ensure a proper connection is present (step 310). If the connection has ceased for more than a threshold amount of time (for instance, 10 minutes), the system 200 may alert the user via the user device 202, for instance.

If the answer to the inquiry at step 308 is "no" or if the process 300 has completed checking for a pulse line fault at step 310, the process 300 then inquires as to whether a threshold period of time (e.g., one hour) has passed (step 312). If the answer to the inquiry at step 312 is "yes", the process 300 proceeds with 1) dividing the flow speed sum for the past hour by timer ticks that occurred throughout the past hour to generate a flow speed average for the past hour; and 2) dividing the pressure sum for the past hour by timer ticks that occurred throughout the past hour to generate a pressure average for the past hour (step 314). Once this data has been processed, the average values for the past hour are transmitted to, for instance, the server 204 and/or the user device 202 (step 316). Once the processed data has been transmitted, the hourly timer ticker is reset in order to be ready to begin again for the subsequent measurement hour (step 318).

If the answer to the inquiry at step 312 is "no", the amount of time left on the hourly timer ticker is reduced by the amount of time that has passed since the last inquiry such that the system can continue to monitor the values for the remainder of the present measurement hour (step 320). Next, the process 300 inquires as to whether 1) a predetermined fraction of the total time (the total time being one hour in the described example) has passed (e.g., a fourth of the total time—15 minutes) since the process 300 has been started; and 2) whether the system 200 has been left unconfigured in the past predetermined fraction of the total time (step 322). This configuration can be, for example, indicating whether the system 200 will utilize data gathered with only the pressure meter 110 or with both the pressure meter 110 and the flow meter 126. If the answer to both questions in the inquiry at step 322 is "yes", the process 300 then determines the device type, transmits the device type message, and clears the startup flag (step 324). In step 324, the user may be asked to indicate whether only the pressure meter 110 or both the pressure meter 110 and the flow meter 126 should be used. This indication can be made with, for instance, the user device 202. The startup flag is cleared in step 324 after the selection is made in order to allow the process 300 to start over anew and omit the previously gathered data in the current hour. If the inquiry at step 322 is "no" because the configuration indication was properly made previously, the process 300 proceeds to step 326 where the process 300 either ends or moves once more to the timer step 302 to begin again. Similarly, the process 300 moves to step 326 after completion of step 324.

Figure 13:
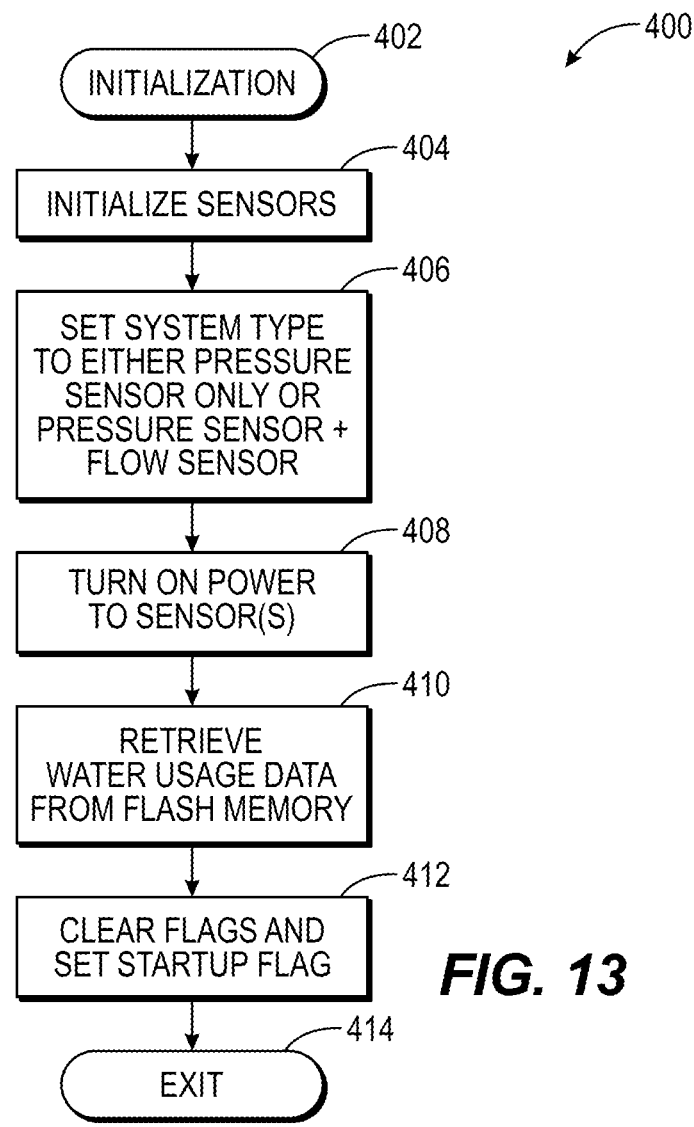
FIG. 13 is a flowchart illustrating an initialization process performed by the water management system of FIG. 7.

FIG. 13 illustrates an initialization process 400. The initialization process 400 may occur upon starting up the system 200 to monitor the flow through the backflow preventer assembly 100. This initialization process 400, therefore, may occur prior to step 302 of the process 300 on the first instance of proceeding through the process 300 (i.e., not happening each and every time the process 300 repeats if the system 200 is already up and running).

The initialization process 400 begins with a command to start initialization (step 402). This command may be made by the system 200 internally due to a timer reaching a predetermined value, or the command may be manually entered by a user via, for instance, the user device 202. Next, the initialization process 400 initializes the sensors 108, 136 (step 404). Initializing the sensors 108, 136 may include, for instance, clearing any preexisting values associated with the sensors 108, 136 to establish baseline values. The initialization process 400 then proceeds with setting the system 200 to either 1) operate with only the pressure meter 110; or 2) operate with both the pressure meter 110 and the flow meter 126 (step 406). This step of setting the system type may be made according to programming of the system 200 that takes into account conditions of the system 200, such as remaining battery life, operational status of the sensors 108, 136, or the like. The system type may additionally or alternatively be made by the user via, for instance, the user device 202. Once the selection has been made in step 406, the process 400 proceeds with turning on the relevant sensor(s) 108, 136 (step 408). In the instance only the pressure meter 110 is selected in step 406, step 408 only turns on the power to the pressure sensor 108. In the instance both the pressure meter 110 and the flow meter 126 are selected in step 406, step 408 turns on the power to both the pressure sensor 108 and the flow sensor 136. Once the sensor(s) 108, 136 have been turned on, the system 200 then retrieves any data stored in memory (step 410). The data may be stored in memory 222 of the server 204, in memory 212 of the user device 202, or locally on each of the pressure meter 110 and the flow meter 126. This locally stored data can correspond to a predetermined period of monitoring time prior to upload, such as, for instance, seven days. After the data has been retrieved from memory, the process 400 then proceeds with clearing any preexisting flags and setting the startup flag (step 412). Clearing any preexisting flags allows the system 200 to avoid any calculation errors or bugs. One the startup flag has been set in step 412, the system 200 is ready to begin the process 300 and, as such, the process 400 ends (step 414).

Figure 14:
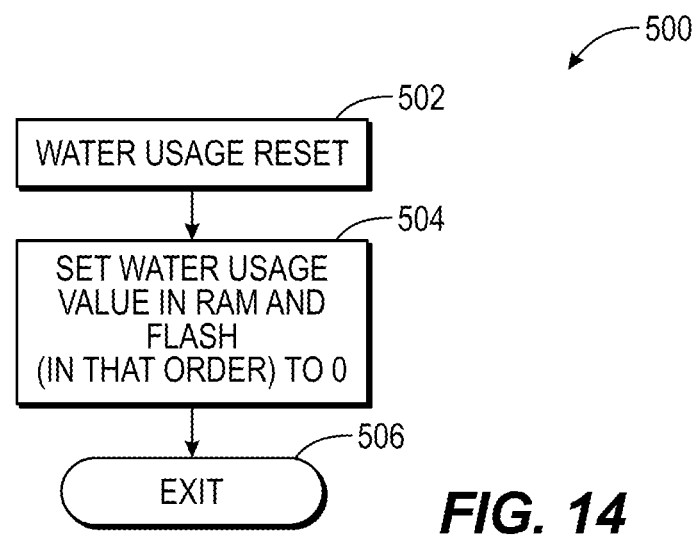
FIG. 14 is a flowchart illustrating a water usage reset process performed by the water management system of FIG. 7.

With reference to FIG. 14, the system 200 may also be configured to be reset by a water usage reset process 500. The reset can be considered to be equivalent to wiping the data in the system 200 related to lifetime water usage and monitoring associated therewith. Such an action may be desired if, for instance, the backflow preventer assembly 100 has been removed and will be placed in a different location, the backflow preventer assembly 100 has undergone testing prior to installation in a location, a new tenant is taking possession of the building that receives its water through the backflow preventer assembly 100, or the like.

The process 500 begins with the system 200 receiving an indication that the water usage data should be reset (step 502). This indication may be received from the user via, for instance, the user device 202 or according to some schedule set and tracked by the system 200. After the command has been received in step 502, the system 200 sets the stored values in its memory related to water usage to the baseline value (e.g., zero) to reset the water usage data (step 504). Once this step has been completed, the process 500 ends (step 506). Some embodiments may include indicating to the user that the process 500 has completed successfully with a message appearing on, for instance, the user device 202.

Figure 15:
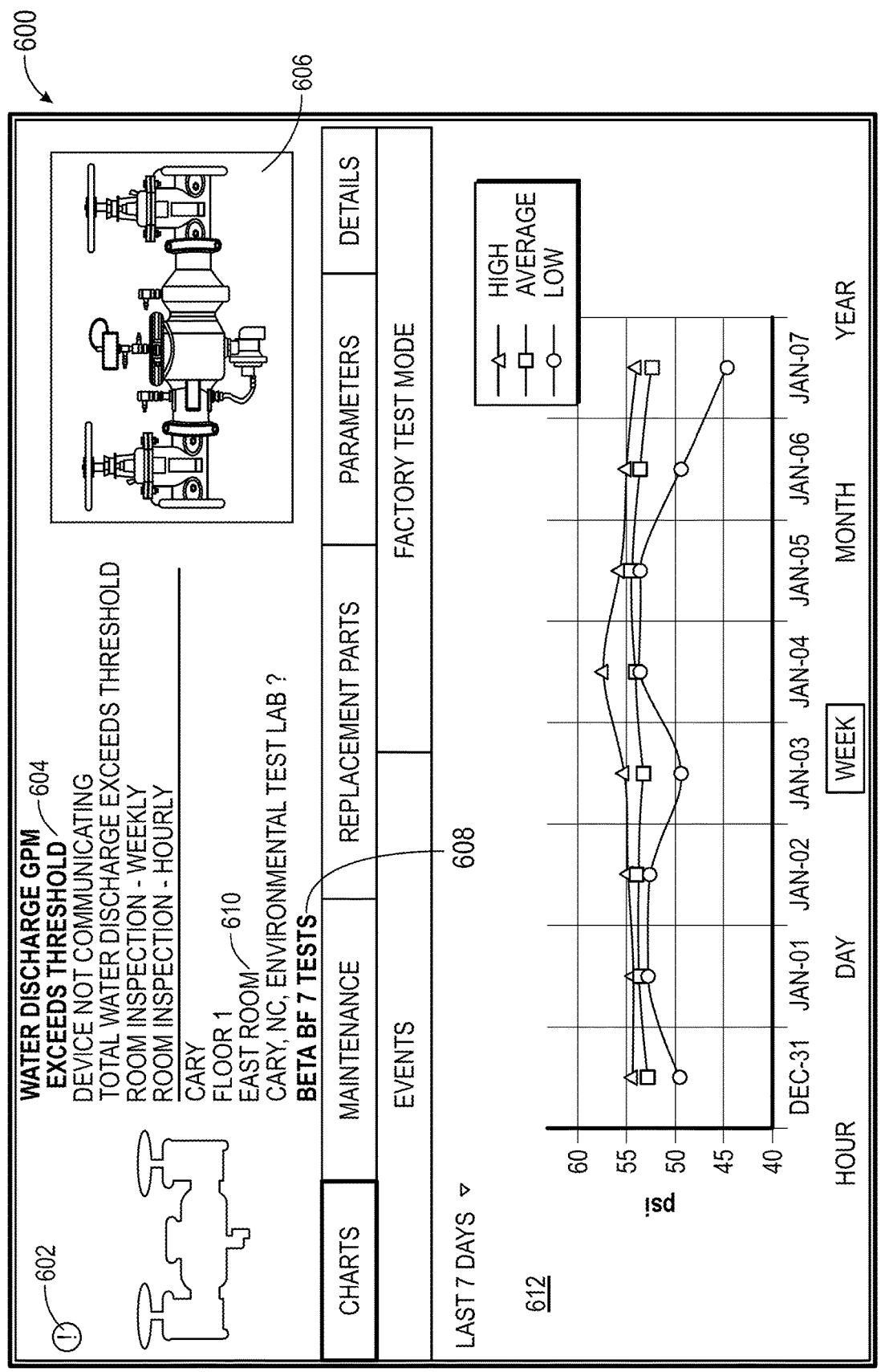
FIG. 15 is a display of a user interface for access via a user device of the water management system of FIG. 7.
Figure 16:
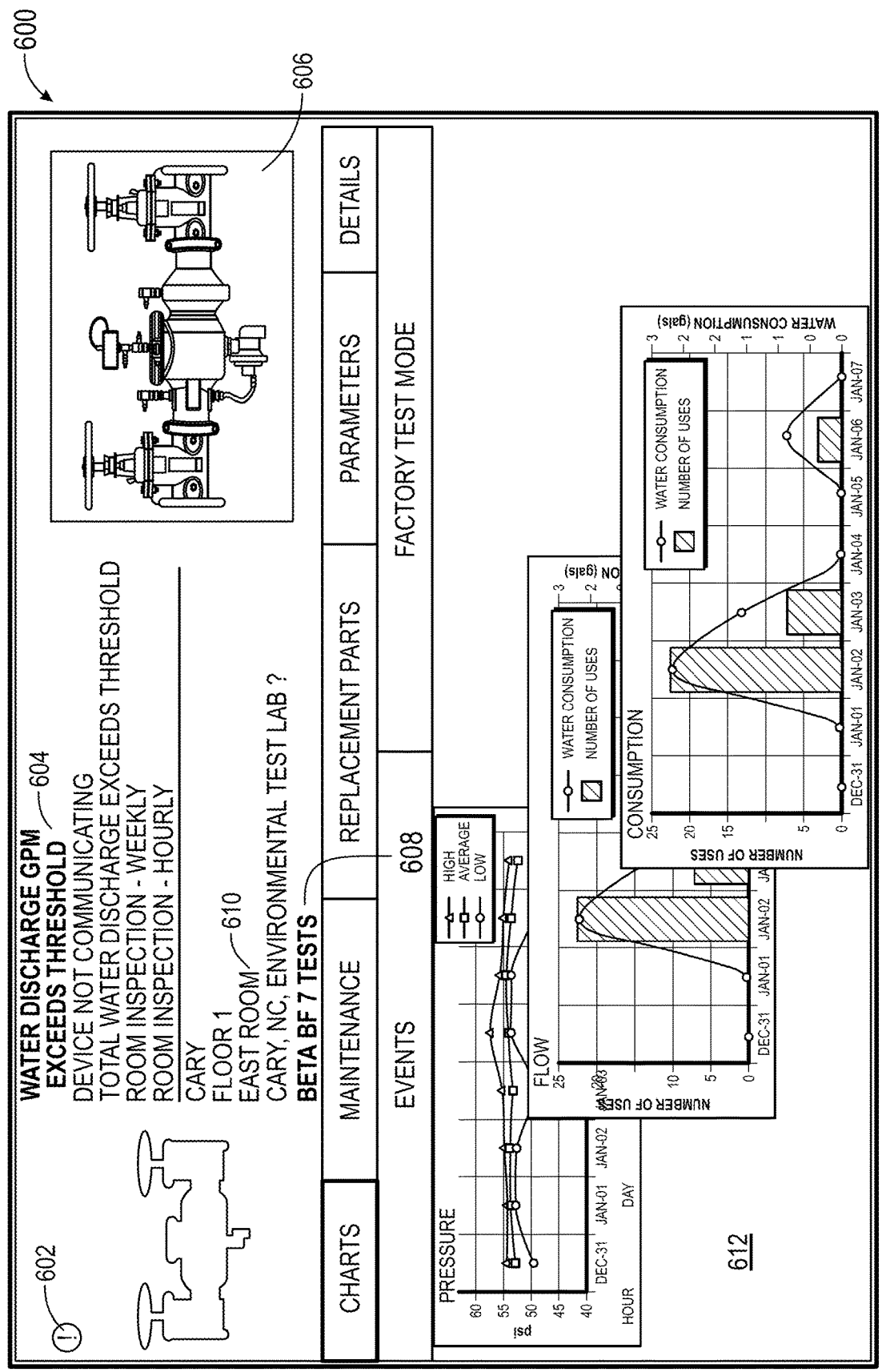
FIG. 16 is another display of the user interface of FIG. 15

As shown in FIGS. 15 and 16, the system 200 also includes an interface 600. The interface 600 may be accessible by a user via, for instance, the user device 202. With the interface 600, the user may access, analyze, and react to the data collected by the system 200. In the interface 600, the data is presented in many different ways and can be customized according to user-defined preferences. The data is also analyzed by various algorithms to provide meaning behind the numbers, generally in the form of alerts and maintenance schedules. In other words, in some embodiments the interface 600 is a single source for managing, monitoring, and reacting to the backflow preventer assembly 100 installed as part of an enterprise's plumbing ecosystem. The interface 600 provides an instant snapshot of the conditions monitored by the backflow preventer assembly 100 and allows the user to drill deeper to analyze and download reports. The interface 600 also provides customization opportunities for system alerts, displays, and charts to align with each user's unique operational parameters and communication preferences. The interface 600 additionally allows each user to stay connected no matter where they are, what they are doing, or the time of day. The interface 600 is also sharable to third parties, allowing the user to invite staff and external service contracting partners to the portal and authorize them to manage the backflow preventer assembly 100.

The interface 600 includes a device profile for the backflow preventer assembly 100. This device profile serves as the primary information repository of the backflow preventer assembly 100. More specifically, the profile provides easy and thorough access to various data sets affecting the backflow preventer assembly 100 such as, for example, a list of past and present alerts, past and present performance charts, scheduled and past maintenance tasks, replacement part data and purchasing capabilities, and operating limits and parameters of the backflow preventer assembly 100.

The device profile of the interface 600 includes: 1) a severity indicator 602 configured to represent the highest severity level associated with the backflow preventer assembly 100, 2) one or more alert titles 604 to briefly describe and title each of the associated alerts, 3) a photograph or depiction 606 of the backflow preventer assembly 100, 4) the name 608 of the backflow preventer assembly 100, 5) the location information 610 of the backflow preventer assembly 100, and 6) a database portal 612 where the user may selectively access various forms of information corresponding to the backflow preventer assembly 100.

The illustrated database portal 612 includes a plurality of screens or displays, each of which is configured to present a unique set of graphical displays, data analysis, and/or data entry capabilities. In the illustrated embodiment, the database portal 612 includes: 1) a chart display, 2) a maintenance display, 3) a replacement parts display, 4) a parameters display, 5) a details display, 6) an events display, and 7) a factory test mode display. Additional or fewer displays may be present in other embodiments. The user may selectively change which display is presented in the database portal 612 by selecting the corresponding tab.

The chart display is shown in the database portal 612 in FIG. 15. In the screen of FIG. 15, only the flow pressure chart is shown. In some embodiments, this flow pressure chart is shown when only the pressure meter 110 was selected for operation in the backflow preventer assembly 100.

In the screen of FIG. 16, the database portal 612 displays multiple charts when the chart display is selected. The user may view one or more of the charts at a time. In some embodiments, this plurality of charts is shown when both the pressure meter 110 and the flow meter 126 were selected for operation in the backflow preventer assembly 100.

The chart display of the database portal 612 is configured to display operational data regarding the use and/or operation of the backflow preventer assembly 100. In some embodiments, different combinations of data sets may be used or a plurality of data sets may be available for the user to selectively choose to display on the graph when viewing the chart display. In the illustrated embodiment, the user can customize the resulting chart by adjusting the pre-determined time period, such as via a drop-down menu.

The maintenance display of the illustrated database portal 612 is configured to display (e.g., in list form), both the upcoming maintenance events and recent past maintenance events corresponding with the backflow preventer assembly 100.

The replacement parts display of the illustrated database portal 612 includes a list of common replacement parts for the backflow preventer assembly 100. In some embodiments, the replacement parts display may include links or other information regarding how or where to purchase the replacement parts. In some embodiments, if one or more replacement parts have already been purchased and are stored by the user, the replacement parts display may include location information of the user's own replacement parts.

The parameters display of the illustrated database portal 612 includes a series of operational parameters associated with the backflow preventer assembly 100. In some embodiments, the user may have the ability to send signals back to the backflow preventer assembly 100 to alter or modify operating conditions and thresholds. In some embodiments, the parameters display also includes a "default" setting that allows the user to return the backflow preventer assembly 100 back to the original factory default settings.

The parameters display of the database portal 612 includes a series of operational parameters that may be individually set by the user. More specifically, some embodiments include 1) a single discharge volume alert configured to inform the user when the amount of water flowing backwards through the backflow preventer assembly 100 during a single discharge event is too great, 2) a daily discharge volume alert configured to inform the user when the amount of water flowing backwards through the backflow preventer assembly 100 during a single day is too great, 3) a high pressure alert configured to inform the user when the water pressure within the backflow preventer assembly 100 is too high, and 4) a low pressure alert configured to inform the user when water pressure within the backflow preventer assembly 100 is too low. In some embodiments, the user may also establish a "shut-down" threshold whereby the system 200 will shut down the backflow preventer assembly 100 and/or related devices if the threshold is exceeded.

In some embodiments, the parameters display may also allow the user to set the parameters of how the data from the backflow preventer assembly 100 is collected, processed, and displayed. For example, the user may set the frequency at which data is collected from the backflow preventer assembly 100 (e.g., once an hour, once a day, once a week, and the like). Furthermore, the parameters display may also include interfaces that allow the user to set "trend" thresholds (e.g., how many data points constitute a trend).

The details display of the database portal 612 may include various information regarding the relevant to the backflow preventer assembly 100. For example, the details display may include product information including, but not limited to, the name of the backflow preventer assembly 100, a short description of the backflow preventer assembly 100, and the specific location and installation details of the backflow preventer assembly 100. The details display may also list relevant model information such as, but not limited to, the type, model, serial number, and ID of the backflow preventer assembly 100. Communication data between the backflow preventer assembly 100 and the system 200 including, for instance, time stamped exchanges may also be included.

The events tab of the database portal 612 may include various information related to the history of operation of the backflow preventer assembly 100, the history of installation and/or maintenance of the backflow preventer assembly 100, the operation history of the backflow preventer assembly 100, and the like.

The factory test mode tab of the database portal 612 may include settings information and/or commands to be selected or read in order to perform various testing on the backflow preventer assembly 100. In some embodiments, for instance, the system 200 may test the operation and responsiveness of the sensors 108, 136. In some embodiments, the system 200 may further be operable to compare the relative pressure outputs of multiple pressure sensors coupled to the backflow preventer assembly 100 to determine when a leak may exist within the backflow preventer assembly 100. Furthermore, in some embodiments, the backflow preventer assembly 100 may be configured so that the user can run one or more of the tests remotely on the device. To do so, the system 200 is configured to actively control the operating conditions of the backflow preventer assembly 100. In other embodiments, the backflow preventer assembly 100 may be paired with an external camera also in communication with the system 200. In such embodiments, the camera may be used to detect if the room in which the backflow preventer is located is flooding.

Although the invention has been described in detail with reference to certain preferred embodiments, variations and modifications exist within the scope and spirit of one or more independent aspects of the invention as described.

What is claimed is:

1. A backflow preventer assembly for a water management system, the backflow preventer assembly comprising:
   a backflow preventer;
   an upstream shutoff valve positioned upstream from the backflow preventer;
   a downstream shutoff valve positioned downstream from the backflow preventer;
   a flow path defined at least partially through the backflow preventer, the upstream shutoff valve, and the downstream shutoff valve;
   a pressure meter including
     a pressure sensor in fluid communication with the flow path during working operation, and
     an electronics housing coupled to the pressure sensor, the electronics housing including an electronic processor in communication with a transmitter, the electronic processor further in communication with the pressure sensor; and
   a flow meter including a flow sensor in fluid communication with the flow path during working operation, the flow sensor in communication with a remote intermediary device, the remote intermediary device in communication with a communication network, wherein the electronic processor is configured to
receive data from the flow sensor, the data including a first group of pulses proportional to a flow of liquid during a first time period,
provide wirelessly, via the transmitter, the data to the remote intermediary device, wherein the remote intermediary device transmits the data to a storage unit for access by the user device, wherein the storage unit is in communication with a remote electronic processor; and
wherein the remote electronic processor calculates a first flow rate based on the first group of pulses and determines whether the first flow rate is within a user specified range of flow rate.

2. The backflow preventer assembly of claim 1, wherein the flow sensor is positioned upstream of the backflow preventer.

3. The backflow preventer assembly of claim 2, wherein the flow sensor is also positioned upstream of the upstream shutoff valve.

4. The backflow preventer assembly of claim 3, further comprising
a conduit removably coupled to an upstream side of the upstream shutoff valve, and
wherein the flow meter is coupled to the conduit.

5. The backflow preventer assembly of claim 1, wherein the backflow preventer further includes
a pair of check valves,
an intermediate zone located between the check valves, and
a test port defined in the backflow preventer, and
the pressure sensor is in fluid communication with the intermediate zone via the test port.

6. The backflow preventer assembly of claim 5, wherein the pressure meter further includes a connector threadingly coupled to the backflow preventer about the test port, the connector coupled to the pressure sensor and the electronics housing.

7. The backflow preventer assembly of claim 1, wherein the flow meter further includes a second electronics housing coupled to the flow sensor, the second electronics housing including a second electronic processor.

8. The backflow preventer assembly of claim 1, further comprising
a second transmitter in communication with the pressure sensor, the second transmitter configured to send signals corresponding to a pressure of fluid flow passing through the flow path.

* * * * *